United States Patent [19]

Cummings et al.

[11] Patent Number: 4,562,855
[45] Date of Patent: Jan. 7, 1986

[54] AUTOMATIC DRAIN VALVE

[76] Inventors: Ernie W. Cummings, 140 Essex Dr., Concord, Tenn. 37720; Nick Valk, Rte. 10, Box 323, Greeneville, Tenn. 37743

[21] Appl. No.: 516,209

[22] Filed: Jul. 21, 1983

Related U.S. Application Data

[63] Continuation-in-part of Ser. No. 299,966, Sep. 9, 1981, Pat. No. 4,444,217.

[51] Int. Cl.⁴ .............................................. F16K 31/08
[52] U.S. Cl. .................................... 137/195; 137/413; 251/65
[58] Field of Search ...................... 137/195, 413, 414; 251/65

[56] References Cited

U.S. PATENT DOCUMENTS 2,856,949 10/1958 Branson ........................... 137/195 X
3,980,457 9/1976 Smith ............................... 137/195 X Primary Examiner—Alan Cohan
Attorney, Agent, or Firm—Pitts and Brittian

[57] ABSTRACT

An automatic drain valve system for collecting and draining a liquid and/or contaminants within a reservoir (148) including a level sensing float (68'). The liquid or contaminants are introduced into the reservoir through an inlet (48) and exit the reservoir (148) through an outlet (176). A control valve which is responsive to the liquid level contained within the reservoir (148) includes coupled magnetic members which selectively open and close the control valve in response to the liquid within the reservoir (148) reaching preselected levels. This control valve activates the drain valve (34') for opening and closing the drain outlet such that the system is automatically drained upon when the liquid within the reservoir reaches a preselected level.

10 Claims, 9 Drawing Figures

AUTOMATIC DRAIN VALVE

This invention is a continuation-in-part of U.S. patent application Ser. No. 06/299,966 filed Sept. 9, 1981, now U.S. Pat. No. 9,444,217, issued Apr. 24, 1984.

TECHNICAL FIELD

This invention relates generally to float-activated drain systems for liquid reservoirs, and more particularly to an automatic drain valve for traps used in the accumulation of condensable materials and other contaminants from pneumatic systems and the like.

BACKGROUND ART

It is conventional to use filters and separators for removing foreign objects, and condensing and removing water and other condensable liquids, from pressurized air lines and the like. Typically, such filters include an air inlet, an air outlet and a filtering element mounted between these elements in the flow path. Such filters also include a reservoir or filter bowl through which the air flow is at least partially passed causing the moisture and other condensate in the air to be collected and condensed on the inside surface of the reservoir or bowl. The force of gravity causes such condensed materials to accumulate at the bottom of the reservoir together with any other foreign objects. Periodically, this accumulated material and liquid must be discharged when the reservoir or filter bowl has become full of material.

Numerous drain systems have been devised for the discharge of the accumulated material. Two such devices are shown in U.S. Pat. No. 3,980,457 issued to J. I. Smith on Sept. 14, 1974 and in U.S. Pat. No. 3,993,090 issued to Paul M. Hankison on Nov. 23, 1976. In the first of these two patents, there are a pair of valves, a pilot valve and a discharge valve. The pilot valve is magnetically operated and includes a float which moves in response to changes in the liquid level within the reservoir to magnetically open and close a fluid valve in response to that liquid level. Opening of the fluid valve may thereafter cause the opening of the second valve for other operations such as the drainage of the reservoir. In the second of the patents, there are also two valves, a pilot valve and a discharge valve. In this device, a float is held in a submerged condition for a time to create a superbuoyancy condition. When a sufficient superbuoyancy condition is acheived, the float suddenly rises to the surface of the liquid causing a snap action of the pilot valve. This opening of the pilot valve then quickly opens the discharge valve for the removal of material contained within the reservoir. In both of these patents, the pressure of the pneumatic system to which the trap is attached is the driving force which opens the discharge valve.

Since the operating valves and the drain valves are located within the reservoir, various disadvantages exist in the devices described in the above-identified patents. For example, the discharge valve or its operator may be damaged by, or may collect, dirt and other abrasive materials during the discharge operation. Also, they may be affected by corrosive action since they are in contact with the collected material. These deleterious conditions affect the future correct operation of the discharge valve. Further, since the discharge valve is located within the reservoir as part thereof, it is difficult and expensive procedure to replace components of this discharge valve. Since the pilot valve also is operated by the air pressure of the pneumatic system to which the reservoir is connected, this valve may become contaminated with some of the impurities.

Still other of these known devices for accumulating condensate and impurities from pneumatic systems are described in the background sections of the aboveidentified patents.

Accordingly, it is an object of the present invention to provide a drain system for a reservoir utilized in the accumulation of condensate, and impurities from pneumatic systems, wherein the discharge valve is located externally to the reservoir to facilitate replacement of components if necessary.

It is another object of the present invention to provide a discharge valve for the reservoir which incorporates a self cleaning feature whereby dirt and other such impurities have negligble effect on valve operation and provides for a positive shut-off every cycle without leaks therefrom.

Another object of the present invention is to provide a pilot or control valve housed in a separate chamber integral with, but separate from, the main reservoir area where collected material is stored whereby the control valve is not affected by pressure, dirt and other contaminants which would cause most pilot valves to fail.

It is still another object of the present invention to utilize a pair of magnets of normally opposite polarity, one in a valve plug and one in a float, that are magnetically coupled such that one of the magnets effectively reverses polarity when the float within a liquid reservoir reaches the uppermost position thereby providing a snap opening of this valve. These magnets are so positioned that at the lowest level of the float, the magnet is again effectively reversed in polarity causing the rapid closing of the associated valve.

Other objects and advantages of the invention will become apparent upon reading the hereinafter detailed description with reference to the drawings.

DISCLOSURE OF THE INVENTION

In accordance with the invention, an automatic drain valve system is provided for the discharge of accumulated condensed materials and other foreign matters from a reservoir when the reservoir is filled to a predetermined level. The valve for the actual draining is positioned externally to the reservoir. Filtered pressurized air, from a separate source, is fed to the operator of the device valve and to a control valve isolated from, but within the reservoir itself. This pilot or control valve is normally maintained in a closed position by a pair of magnetically-coupled magnets, one being in the control valve plug and one in the float surrounding the control valve within the reservoir. The polarity of these magnets is chosen such that when the float is in the lowest position or is rising within the reservoir, the magnets oppose each other. This causes the control valve plug to close against the control valve seat. When the float reaches its uppermost position, the relative polarity of one of the magnets is effectively reversed causing the control valve plug to move away from the control valve seat thereby permitting pressurized air flow to the drain valve operator with the result that the drain valve is suddenly opened. This effective reversed polarity of one magnet persists until the float reaches its lowest position at which time the polarity effectively reverses. This reversal causes the control valve plug to again move against the control valve seat and the air pressure to the drain valve operator is reversed and/or vented causing the drain valve to suddenly close. The pressure at the control valve determines when the drain valve operator is to be moved from a closed to an open position and then returned to a closed position.

BEST MODE FOR CARRYING OUT THE INVENTION

Figure 1:
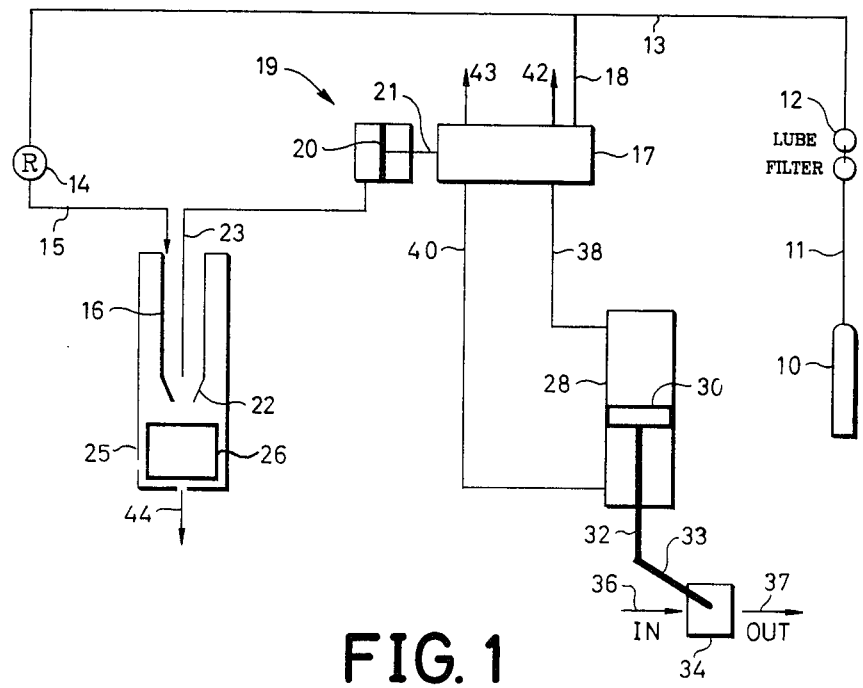
FIG. 1 is a schematic flow diagram of a pneumatic system which can incorporate the present invention.

Referring now to FIG. 1, a schematic flow diagram is shown for a pneumatic system used to operate the present invention. Air from a pressurized source 10 is fed through line 11 to a conventional filter lubricator 12 and thence through line 13 to a regulator 14. The output (e.g. 5 psi) from the regulator 14 feeds through line 15 to the interior of proximity sensor tube 16. The tube 16 terminates in a valve seat 22. Filtered pressurized air is also fed to a multi-ported valve 17 through line 18. A typical low pressure valve for this application is Clippard Instrument Laboratory Model R-405. This valve 17 has an operator 19 which consists of a piston 20 and a piston rod 21. The volume above the piston 20 is connected by a line 23 to the center of the proximity sensor tube 16 adjacent the valve seat 22. Proximate the valve seat 22 is a valve plug 26. This valve plug 26 is either in contact with or displaced from the valve seat 22 by the method described hereinafter. As will be described below, the proximity sensor tube 16 and its valve seat 22 together with the valve plug 26 are contained within a separate closure 25.

External to the reservoir, in one embodiment, is a pneumatic cylinder 28 containing an axially-movable piston 30. This piston 30 is provided with a piston rod 32 extending through an end of the cylinder 28, and the outward end of the rod 32 is pivotally connected to a discharge valve operator arm 33 of valve 34. An inlet line 36 to valve 34 connects to a reservoir to be drained (not shown), and an outlet line 37 connects to any appropriate drain or catch basin. The cylinder 28 is provided with pneumatic lines 38, 40, one on either side of piston 30 which lines are connected to appropriate ports of the valve 17. The valve 17 is provided with vent lines 42, 43, respectively connectable to lines 38, 40. Also, enclosure 25 on the proximity valve components is provided with a vent line 44.

Figure 2:
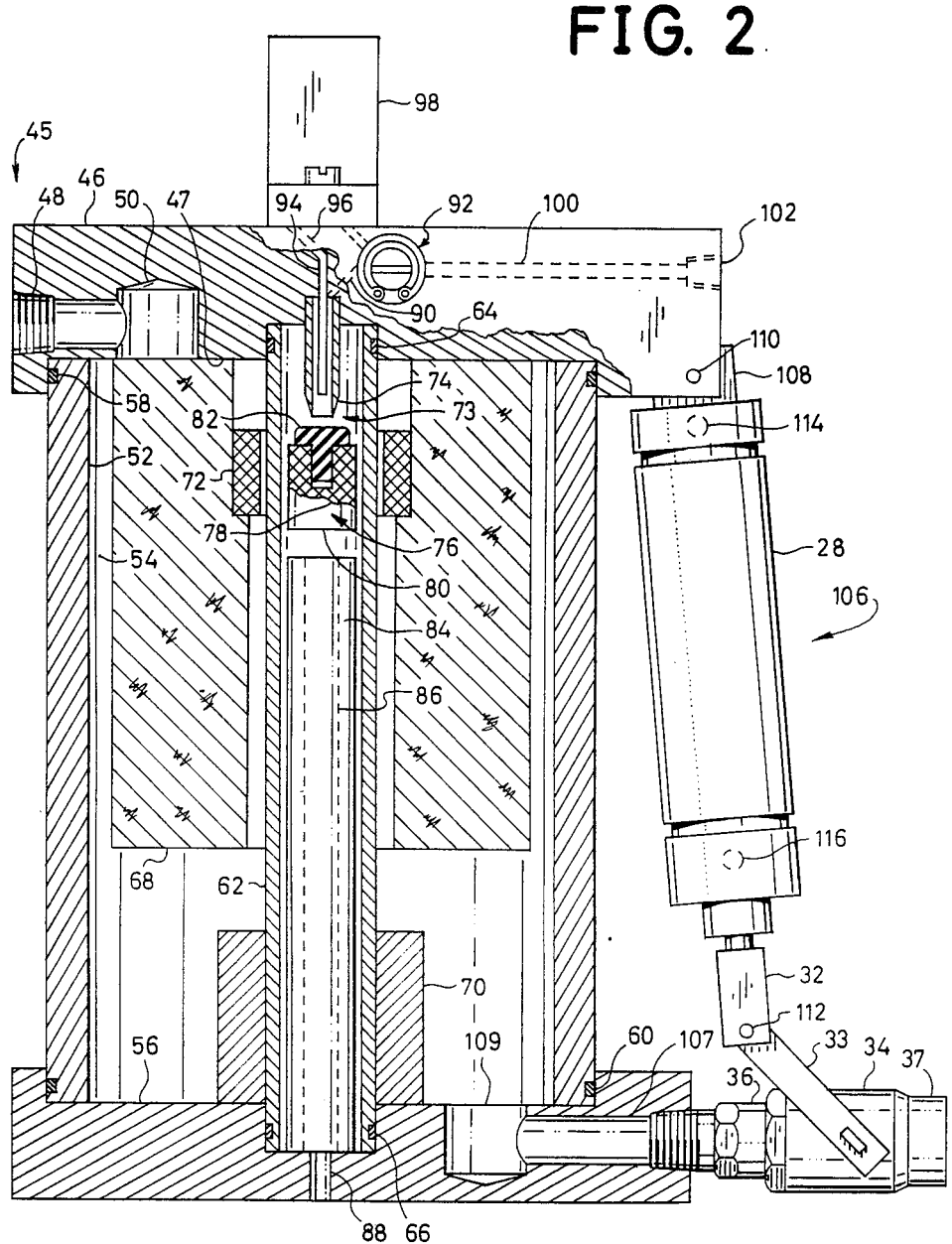
FIG. 2 is a vertical cross-sectional view of a unit incorporating features of the present invention showing the control valve, the magnets, and the discharge or drain valve and an operator.

A cross-sectional view of the present device for accumulating condensable materials and other foreign matters from a pneumatic system, together with means for draining the reservoir of this device, is shown in FIG. 2. A separator/reservoir 45 of this embodiment has a top housing 46 which is provided with an inlet 48 for connection to any pneumatic or other gas system from which condensate and foreign materials are to be removed. Formed within the lower face of the housing 46 is an arcuate channel 50 which serves as a moisture condenser/filter as condensable collect on the surface thereof. Depending from below the housing 46 is a cylindrical shell or sleeve 52 which forms the wall of the reservoir. The bottom of the reservoir is formed from base plate 56, and seals 58, 60 are inserted between the shell 52 and the top housing and bottom plate, respectively. Axial bolts or other means are provided (see FIG. 7) for maintaining the sleeve 52 firmly clamped between the header 46 and the bottom plate 56. This structure creates a reservoir volume 54 as shown. The aforementioned channel 50 communicates with this reservoir volume 54 whereby the volume 54 is used to collect the condensate and other material that are removed from the pneumatic system. Mounted within the reservoir is a hollow cylinder 62 (corresponding to element 25 of FIG. 1) which is sealed to the upper housing 46 with an appropriate seal 64 and to the bottom plate 56 with an additional seal 66. Generally surrounding the cylinder 62 is a buoyant member 68 which is slidable along the cylinder 62 from a top position wherein the top of the buoyant member or float 68 is in contact with the under surface 47 of the housing 46, to a bottom position wherein the bottom surface of the float 68 rests against a float stop 70. The annular opening, which is sufficient to minimize the collection of foreign materials, within the float 68 can be provided with guides (not shown) to assist in the movement of the float between its most distant positions. Mounted within the top of the float or proximate thereto is an annular magnet 72 (e.g. $2 \times 1.3 \times 1$ in.) which encircles the cylinder 62.

Within the upper portion of the sleeve 62 is a proximity or control valve 73 which consists of a valve seat 74 and a valve plug 76 (equivalent to elements 22, 24 of FIG. 1). The valve plug 76 in turn consists of a cylindrical magnet 78 (e.g. $0.87 \times 1$ in.) encased in a protective layer 80. The top of the plug 76 is provided with a resilient cap or plug 82 for contact with the valve seat 74. Positioned beneath the valve plug 76 is a cylindrical stop in the form of a hollow cylinder 84 the purpose of which will be described hereinafter in connection with the relationships of the magnet 72 and 78. The stop 84 is provided with a central passageway 86 which communicates with an outlet passage 88 (vent 44 of FIG. 1) through the base plate 56. Filtered air is supplied to the interior of the pilot valve seat 74 through a tube 90 from regulator 92. Coaxially mounted within the pilot valve 73 is a capillary tube 94 which communicates through passageway 96 to a four way valve 98 (the time 17 of FIG. 1). Air is supplied to the valve 98 and to the regulator 92 by means of an inlet 102 and a passageway 100. Although not shown in this figure, the valve 98 communicates with additional passageways in the header 46 for the purposes described hereinafter.

Shown at the right of the FIG. 1 is a drain valve 34 and operator system 106. This operator system 106 is made up of the aforementioned cylinder 28 which is attached to the top header 46 with a yolk 108. The yolk is mounted to the top header with a pivot pin 110. Extending from the bottom of the cylinder 28 is the aforementioned piston rod 32 which is pivotally connected to a valve operator 33 of valve 34 with a pin 112. The valve 36, in turn, is connected to the bottom header 56 by a fitting in the inlet line 36. The fitting communicates with passageway 107 within the base plate 56, with this passageway communicating with a sump 109. The outlet from valve 34 leads through conduit 37 to an appropriate collection vessel for the products drained from the reservoir. Although now shown, pneumatic lines for the operation of the piston within the cylinder 28 are attached to the cylinder at ports 114 and 116. The purpose of these lines will be described hereinafter.

Figure 3:
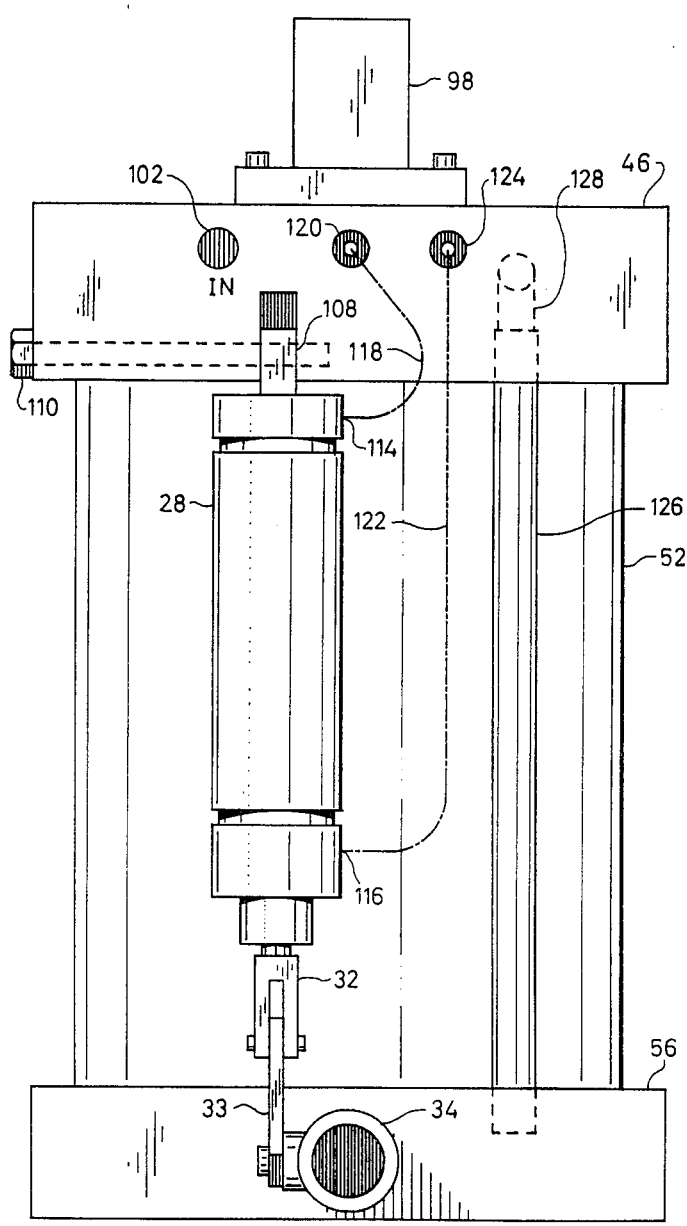
FIG. 3 is a plan view of a unit constructed in accordance with the present invention taken at right angles to the view shown in FIG. 2.

A side elevational view of features of the subject invention is shown in FIG. 3. It may be seen that the inlet port 114 at the top of cylinder 28 is connected by a pneumatic line 118 (same as line 38 of FIG. 1) to a port 120 which communicates with the aforementioned valve 98 (FIG. 2). In a similar manner, the second port 116 at the bottom of cylinder 28 communicates through a pneumatic line 122 (same as line 40 of FIG. 1) to a port 124 in the top of header 46 which, in turn, is likewise connected to the valve 98. This figure also shows an optional liquid level indicator line 126 which communicates with an internal passageway 128 to the internal volume 54 of the reservoir.

Referring again to FIG. 1, the pneumatic operation of the subject invention can be described with reference to this schematic drawing. Normally, pressurized air is fed from source 10 or other appropriate source to the filter and lubricator 12 and then to the proximity valve 17 through corresponding lines 13 and 18. This low pressure air is also admitted through line 13 and regulator 14 into the internal volume of the pilot valve seat 22 through line 15. When the valve plug 26 is firmly seated against the valve seat 22, the pressure extisting in line 15 also exists in line 23 which is connected to the valve operator 19 of control valve 17. This pressure in line 23 causes the piston 20 and piston rod 21 to move the control valve 17 so as to provide a pressure through line 40 to the volume in cylinder 28 below the piston 30. At the same time, the volume above the piston 30 in the cylinder 28 is connected through line 38 to the exhaust line 42. This results in maintaining the piston 30 in an elevated position within the cylinder 28 and thus the piston rod 32 moves the valve operator 33 such that valve 34 is in a closed position. Thus, the line 36 from the reservoir is closed from the counduit 37. When, however, the valve plug 26 is displaced from the valve seat 22 in a manner to be described hereinafter, the air through line 15 entering the valve seat 22 is exhausted through line 44. Under these conditions, the pressure in line 23 is substantially reduced. This causes the valve 17 to reverse the air flow to the cylinder 28. Accordingly, air pressure is admitted to the cylinder 28 through line 38 and the volume below the piston 38 is exhausted through line 40 and vent line 43. This causes a downward movement of the piston 30 and the piston rod 32 which in turn moves the valve operator 33 to fully open the valve 34 thereby permitting full flow through line 36 to line 37 and thereby draining the reservoir. When the reservoir is fully drained, the pilot or control valve plug 26 again contacts the valve seat 22 and thereby the initial condition occurs whereby drain valve 34 is again closed.

Figure 4:
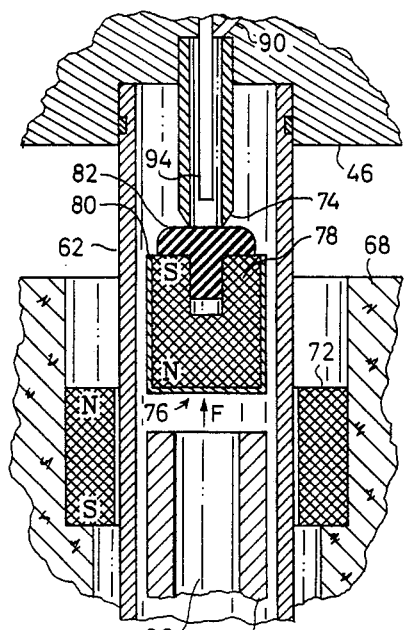
FIG. 4 is a fragmentary view of the pilot or control valve and the float of the present invention when the float is in the most downward position and is about to rise due to accumulation of condensable liquid in the reservoir.
Figure 5:
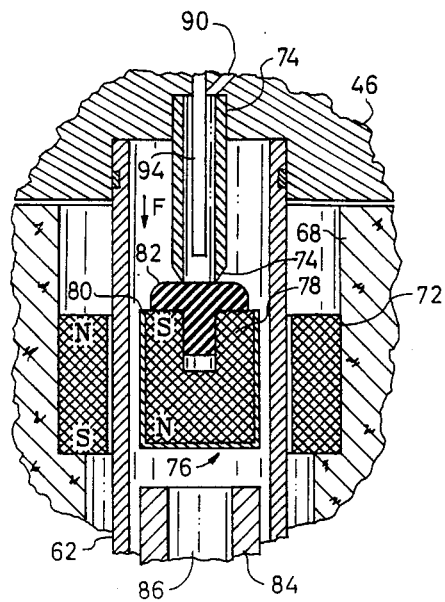
FIG. 5 is a fragmentary cross-sectional view of the present invention as the float reaches the uppermost position causing the reversal of the polarity of the magnet mounted within the valve plug.
Figure 6:
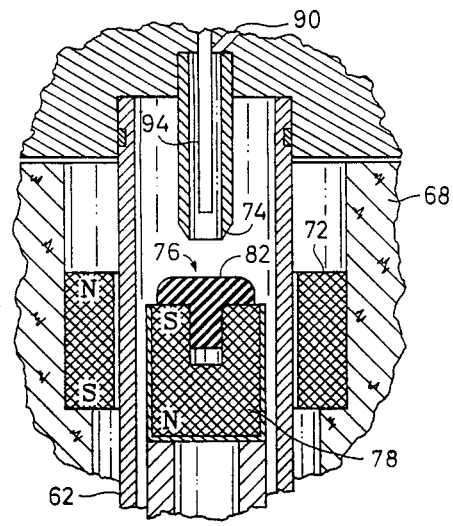
FIG. 6 is a fragmentary cross-sectional view of a control valve and float after the reversal of the magnetic polarity and during the downward movement of the float due to discharge of accumulated liquid from the reservoir.

The operation of the pilot valve to accomplish the opening and closing of the valve 34 can be understood by referring to FIGS. 4 through 6. Referring to FIG. 4, taken together with FIG. 2, the pilot valve is shown when the float 68 is in its lowest position as established by the float stop 70 (see FIG. 2) or is rising in the reservoir. The spacing of the float stop 70 and the valve plug stop 84 are such that magnets 72 and 78 are always magnetically coupled such that their normal reverse polarity (as indicated) causes the valve plug 76 to be raised firmly against seat 74 (or seat 22' in FIG. 9). Thus, the sealing member 82 is firmly forced against the valve seat 74. As disucssed above, this maintains the drain valve 34 (see FIG. 2) in a closed position. As indicated, the magnetic force F is in an upward direction in this position.

Referring now to FIG. 5, this illustrates the float 68 in the most upward position; that is, against the under surface of the header 46. When in this position, the magnets 72 and 78 are substantially aligned in height. The magnetic field generated within magnet 72 causes an effective reversal in the polarity of the magnetic field within magnet 78. This effective reversal is not instantaneous due to the hysterisis of the magnet 78. However, when polarity of the magnetic field within magnet force F is effectively directed downwardly whereby the valve plug 76 is removed from the valve seat 74 to rest against the stop 84. Air pressure within the valve seat 74 is thereby released around the periphery of the valve plug 76 and is permitted to exit through channel 86 and passageway 88. As discussed above, this permits an opening of drain valve 34 whereby the float 68 is lowered to the initial position as shown in FIG. 4. At the lowest position of float 68 within the reservoir, the polarity of magnet 78 is again effectively reversed bringing about conditions whereby the valve plug 76 is again forced against the valve seat 74. The intermediate condition wherein the float is in an elevated position, but dropping as the pilot valve is opened, is illustrated in FIG. 6. This same magnetic coupling and polarity reversal occurs in the operation of the unit shown in FIG. 9 which incorporates magnets 72' and 78'.

Figure 8:
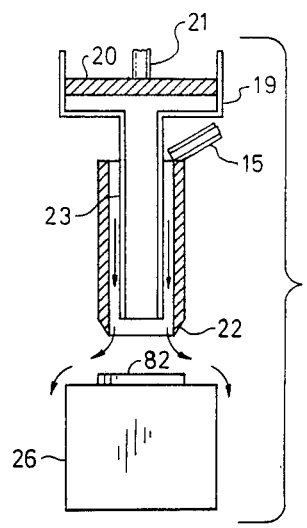
FIG. 8 is a schematic drawing further illustrating the operation of the control valve of the subject drain valve system.

It will be recognized that the magnet polarity reversal which occurs at the top and bottom extreme travel of the float 68, and the delay imparted by the hysterisis during this reversal, operates the pilot valve in a "snap on" and "snap off" manner. It is essential that the pilot valve operate reliably whenever the float 68 reaches an exact position within the reservoir. The particular construction shown in FIG. 2 has been found to provide this reliable operation. The specific operation thereof can be explained in more detail by reference to FIG. 8. As discussed above with reference to FIG. 1, when the valve plug 26 is in position such that its cap 82 is against the valve seat 22, regulated air pressure entering through line 15 creates an equal pressure in capillary 23. This pressure within capillary 23 causes the piston 20 in control valve operator 19 and the piston rod 21 attached thereto to move the aforementioned control valve 17 (see FIG. 1) in a direction to provide the needed air pressure to the drain valve operator to maintain the drain valve in the closed position.

However, when the valve plug 26 is rapidly removed downwardly away from the valve seat 22 by the operation of the aforementioned magnets, the air flowing through line 15 is vented through the valve seat 22. This venting of the air creates a venturi action about the capillary 23 which causes a rapid decrease of the pressure therein. This reduction of internal pressure within the capillary 23 causes the piston 20 and the piston rod 21 of the control valve operator to move axially (downwardly in this FIG. 8) so as to move the control valve and reverse the application of pressure to the drain valve operator. When the valve plug 26 rises to fully contact the valve seat 22 the pressure in capillary tube 23 is substantially increased giving a positive action of valve 17 and thus to the drain valve 34. This combined rapid operation of the pilot valve and the control valve operator 19 occurs at precise times for each operation of the pilot valve and thereby assures that the reservoir will not overfill nor drain at a time prior to substantial filling.

The rapid and complete manner of operation of the components is important to the operation of the present invention for several reasons. The main benefit of the rapid operation is in the corresponding rapid operation of the piston within the cylinder 28. The air supply provided to the volume above the piston 30 through port 114 is multiplied by the area of the piston whereby considerable force is available to move the piston rod 32 axially away from cylinder 28, and the connecting rod 33 rapidly operates valve 34 for the draining of the reservoir. Through rapid operation of this valve, full flow condition exists quickly whereby all contents of the reservoir are forced through valve by the pressure of the pneumatic system to which the subject invention is attached. This assures a rapid and complete removal of the contents of the reservoir brought about by the pressure in the pneumatic system. Again, when the reservoir is empty, the valve 34 is rapidly closed thereby minimizing any erosion of its components or the accumulation of residual material exiting from the reservoir. Since the valve 34 is a rotary valve and power assisted, any foreign material that may be present is cleared from the surfaces and thereby cannot prevent the valve from closing as in the case of an axially moving valve.

Figure 7:
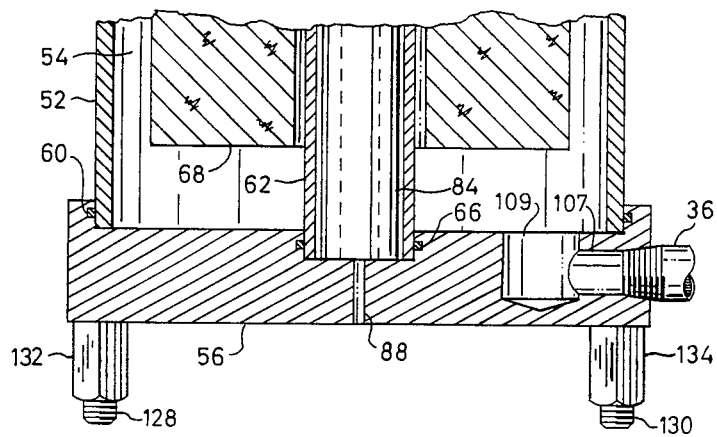
FIG. 7 is a framentary cross-sectional view of another embodiment of the lower portion of the reservoir of the subject drain valve system.

Another embodiment of the reservoir portion of the present invention is illustrated in FIG. 7. In this embodiment, the cylindrical wall 52 of the reservoir is shortened such that the float stop 70 (see FIG. 2) is not required. Alternately, the float 68 may be lengthened accordingly such that the bottom plate 56 forms the bottom stop for the float. This particular construction has the advantage that when the float 68 reaches its lowermost travel, that is, against the top of the bottom plate 56, the float closes the opening of the sump 109. This closure of sump 109 further enhances the shut off of the fluid flow out through passageway 107 and connector 36 leading to the drain valve (not shown). This construction principally prevents undue air pressure from leaving the reservoir prior to the automatic closing of the rotary valve. Shown also in FIG. 7 are the typical bolts 128, 130, and the respective nuts 132, 134 that are utilized for holding the reservoir together.

Figure 9:
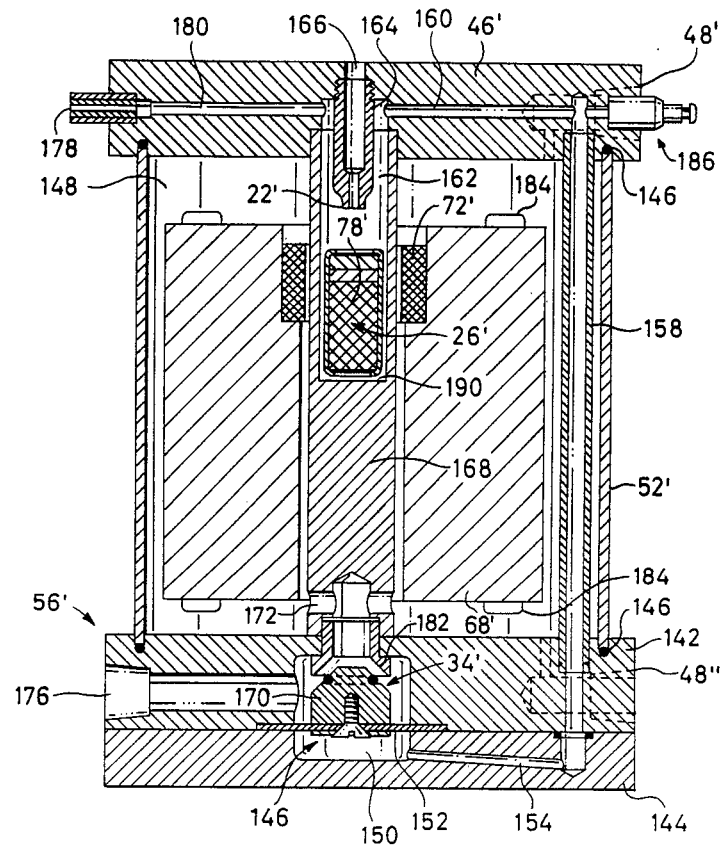
FIG. 9 is a sectional view of a further embodiment of an automatic drain valve system constructed in accordance with various features of the present invention.

An improved drain valve is illustrated in FIG. 9. This drain valve operates in a manner similar to the operation of the drain valve illustrated in the previous figures and described above, and certain components of the drain valve or unit 140 illustrated in FIG. 9 which are similar to the previously described conponents will be referred to by primed numerals.

Water and condensate enter the cylindrical sleeve or shell 52' through the inlet port 48' in the header 46'. A further inlet port 48" is provided in the base or bottom plate 56'. Moreover, as described above in connection with the previous embodiments, suitable outlet means are provided for the flow of the air from the pneumatic system through the reservoir. It will be noted, in the illustrated embodiment the base plate 56' includes two sections 142 and 144. These sections are substantially similar in cross-sectional outline and are joined at the abutting surfaces to define the cavity generally indicated at 146, which is formed to by registering recesses in the plate sections 142 and 144, respectively. It can also be seen that the ends of cylindrical wall or sleeve 52' are received in annular recesses in the header 46' and the base plate section 142 and are sealed by O rings 146. This construction simplifies the fabrication of the valve 140 and establishes a water impervious basin or reservoir 148 into which the water and condensate from the pneumatic system flow.

As water and condensate enter the reservoir 148 through the ports 48' and 48" connected with the pneumatic system, the float 68' will rise causing the inner cylindrical magnet 78' to drop proximate the position shown in FIG. 9. This magnet 78' rests on the stop 190 and is held in position by the magnet polarity and coupling described above. This movement of the cylindrical magnet is a result of the interaction of the annular magnet 72' as described hereinabove. At this point air is allowed to vent from the cavity 150. This cavity 150 is defined by the diaphram 152 and the cavity wall defined in section 144 of the base plate 56'. The air is vented through the port 154 in the base plate, the conduit 158 and the port 160 in the header. It will be noted that one end portion of port 160 communicates through the cavity 162 through the vent tube 164 to ambient atmosphere through the opening 166. This cavity 162 is defined by the upper end portion of the cylindrical member 168 which rests at its opposite end portion on the upper surface of the section 142 of the base plate 56'. This cavity holds and guides the cylindrical magnet 78' which selectively opens and closes the valve seat 22' for venting the cavity 150 below the diaphram.

When this cavity 150 is vented the valve closure member 170 of the drain valve 34' drops to the position indicated in FIG. 9 for dumping the liquid and condensate from the reservoir 148. More specifically, the water and condensate pass through port 172 of the cylindrical member 168 through the valve seat 174 and out the port 176.

As the reservoir 148 is drained through the port 176 by movement of the valve plug 170 away from the operatively associated valve seat, the magnet 72' moves in a downwardly direction and thereby forces the cylindrical magnet 78' upwardly closing the vent tube opening 166, as the coated upper surface of the magnet 78' engages the valve seat 22' as described in greater detail hereinabove. As necessary or desired, a suitable valve plug such as the plug 82 shown in FIG. 5 can be carried proximate the upper portion of the cylindrical magnet 78' to positively seal the opening 166.

With the opening 166 closed, pressurized air flowing from a conventional source through the orifice 178 and port 180 is prevented from exiting the cavity 162 through the opening 166. Thus, this air passing through the port 180 in the header 46' enters the port 160 through the illustrated annular cavity circumscribing the vent tube 164 in the header. This pressurized air then passes through the tube 158 into the port 154 and applies pressure in an upward direction as seen in FIG. 9 to the diaphram 152 causing the valve member 170 to engage the valve seat 182 to thereby closing the opening through which the water and condensate exit the reservoir 148.

In summary, water and condensate enter the reservoir 148 through the openings 48' and/or 48" positioned at the upper and lower portions, respectively of the unit. When the float is in the down position, that is the water and condensate have been drained from the reservoir 148, the inner magnet 78' seals the opening 166 by engaging the valve seat 22' and prevents the air, entering the orifice 178 and traveling through the port 180, from entering the opening 166 and venting to atomsphere. Thus, this pressurized air is directed through the conduit 158 and develops pressure below the diaphram 152 as seen in FIG. 9 which seals the water and condensate outlet or port 176.

In this condition the system is poised for receiving the water and condensate which will cause the float 68' to rise thereby moving the magnet 78' to the position illustrated in FIG. 9, which is its lower position. This allows air to vent from the cavity 150 below the diaphram 152 and the water contained within the reservoir 148 will discharge as the valve member 170 moves to the position illustrated in FIG. 9 away from its valve seat 182. As the float falls to the lower portion of the reservoir 148 the process will repeat itself automatically.

As illustrated in FIG. 9, protrusions 184 are mounted on the upper and lower surfaces of the float 68'. These protrusions prevent the float from adhering to the header and base plate during operation. Such adherence or cohesion may be occasioned without the protrusion due to impurities such as oil which can cause a surface-to-surface bonding that would impede or prevent the proper operation of the unit.

As described generally above, air is supplies to orifice 178 from a source of conventional design. It has been found that air pressure in a range from 20-60 p.s.i. properly activates the valving operations of the drain valve 34'.

A manual override generally indicated at 186 in FIG. 9 serves to automatically dump or drain the system when depressed. More specifically, this manual override includes a two-way normally closed air valve mounted in the header 46' as illustrated, in fluid communication with the port 160. When the manual override valve operator is depressed, the pressurized air entering the unit through the orifice 178 is vented to atomsphere which causes a reduction of the air pressure below the diaphram 152. More specifically, the cavity 150 is vented to atmosphere and the diaphram 152 moves downwardly which opens the valve seat 182 allowing the reservoir 148 to drain through the outlet port 176. When the operator releases the manual override valve 186, the system assumes its normal mode of operation and repeats the fill and drain cycle.

The drain valve 34' which includes the valve closure or plug member 170 and the valve seat 182 is opened during the drain down operation. When this valve is opened, water or condensate contained within the reservoir 148 exits the unit through the outlet port 176. This water and condensate may contain contaminants which tend to prevent proper operation of the drain down valve. As illustrated in FIG. 9, this valve member 170 is secured to the flexible diaphram 152 carried at its perimeter between the base plate section 142 and 144. The upper portion of this valve is substantially conical in shape as illustrated and carries an "O" ring which positively seals the valve seat 182 as the unit is filling with the water and condensate. This "O" ring seal provides a soft closure with the seat 182, initially, and as the pressure increases within the cavity 150, a metal to metal closure is created to form the positive closure or seal. Preferably, the seat will be made from brass and the plug or closure member 170 will be fabricated from stainless steel. Moreover, this configuration of the seat and closure in the valve provides a self wiping feature as the plug opens upon the release of pressure from the cavity 150. Further, it has been found that this plug and seat configuration prevents extruding of the diaphram.

While a conical plug and seat have been illustrated in FIG. 9, testing of the unit has indicated that a spherical plug and seat can perform satisfactorily and provides advantages similar to the advantages incorporated in the conical plug and seat valve.

In accordance with another feature of the invention, it has been found that the orifice 178 through which the pressurized air is directed during its path to the cavity 150 through the tube 158 allows for a constant pressure under the diaphram or in cavity. This orifice assists in providing a uniform valve seating regardless of line pressure fluctuation. Thus, no adjustments are necessary at the time of installing the unit as would be required with a unit employing a regulator. This improved system can be factory set and therefore maintenance requirements will be reduced.

From the forgoing description it will be recognized that an improved automatic drain system valve has been provided for collecting and draining the reservoir used for accumulating condensate and other foreign materials in pneumatic systems. The system includes a control valve incorporating a magnet valve plug 22' which, in response to the level of the liquid within the unit reservoir, selectively operates a drain valve 34' for draining and collecting the condensate and water from the pneumatic system. The separate drain valve which opens the condensate collecting reservoir for the drain down operation, incorporates a self cleaning feature which assists in preventing contaminants from fouling the valve. This drain valve, in the preferred embodiment also includes a soft seat and a positive or metal-to-metal seat which assures proper sealing in a manner which is substantially independent of the pressure differential used to operate the valve. The improved unit illustrated in FIG. 9, is designed to be easily manufactured and readily disassembled for purposes of cleaning. Moreover, the necessity of a pneumatic regulator has been eliminated inasmuch as the valving is substantially independent of the line pressure. Thus, the unit can be factory set and will require little maintenance for continued and correct operation.

It is of course understood that although a preferred embodiment of the present invention has been illustrated and described, various modifications thereof will become apparent to those skilled in the art. Accordingly, the scope of the invention should only be defined by the appended claims and the equivalents thereof. For example, the drain valve has been illustrated as having a substantially conical cross-sectional outline. It will of course be recognized that this valve can assume various geometric configurations, such as a half spherical shape.

We claim:

1. An automatic drain valve system for collecting and draining a liquid and/or contaminants contained within a reservoir including a level sensing float, said reservoir being defined by the system housing, said system including:

inlet means for introducing such liquid into said reservoir;

outlet means for draining said liquid from said reservoir;

a control valve responsive to the liquid level contained within said reservoir, said control valve including a valve seat, a movable valve plug cooperating with said seat, an annular magnetic member carried by said float and a cooperating magnetic member having a normally opposite polarity to that of said annular magnet member serving as an actuator for said valve plug positioned substantially along the central axis of said annular magnetic member, said magnetic members being magnetically coupled such that said cooperating magnetic member is moved between first and second positions along said central axis in response to the opposite movement of said annular magnetic member carried by said float;

a pneumatically operated drain valve means operatively associated with said control valve, said drain valve means selectively opening said outlet means when said liquid within said reservoir reaches a first and upper preselected level causing said control valve means to assume its first position, said drain valve means being closed in response to the operation of said control valve and movement of said cooperating magnetic member to its second and lower position when said liquid within said reservoir is drained to a second preselected level; and a pneumatic source means connected to, and operative of, said drain valve means in response to said control valve.

2. An automatic drain valve system for filter traps used in the accumulation of condensate and foreign material present in a pneumatic system, which comprises:

a housing provided with an inlet and an outlet for flow-through communication with said pneumatic system;

a reservoir defined by said housing and communicating with said housing for collecting such condensate and foreign material, said reservoir provided with an outlet port proximate the lowest level thereof;

a cylindrical member mounted within said reservoir and sealed against communication with said reservoir, said cylindrical member being provided with a recess opening onto the upper end portion thereof;

a control valve mounted axially within said recess of said cylindrical member, said control valve comprising a vent tube having one end portion providing communication with the atmosphere, and a further end portion defining a fixed seat, and an axially moving valve plug cooperating with said seat for selectively opening and closing said vent tube;

an annular buoyant float respondable to liquid in said reservoir surrounding said cylindrical member and slidable along said cylindrical member from a low position to a high position;

an annular magnet of one polarity mounted in said float member proximate said cylindrical member;

a second magnet mounted in said valve plug having a magnetic coupling with said annular magnet from said low position to said high position of said float, said magnet normally having a polarity opposed to the polarity of said annular magnet;

a drain valve for said reservoir mounted external to said reservoir, said drain valve having an inlet and an outlet, said inlet communicating with a lower portion of said reservoir;

a pneumatically operated valve plug mounted on said housing for opening and closing said drain valve; and pneumatic means connected between said control valve and said pneumatic valve operator of said drain valve whereby said operator opens said drain valve when said float reaches a high position and closes said drain valve when said float reaches said low position.

3. The system of claim 2 wherein said pneumatically operated valve plug mounted on said housing for opening and closing said drain valve defines a section which is substantially conical in cross-sectional outline, and wherein said drain valve includes a seat which receives and mates with said section of said plug having a conical cross-sectional outline.

4. The system of claim 2 wherein said valve plug for opening and closing said drain valve is carried by a distendable diaphram pneumatically positioned by operation of said control valve.

5. The system of claim 2 wherein said magnetic coupling causes the polarity of said cooperating magnetic member to be effectively reversed to match the polarity of said annular magnetic member when said float reaches a high position and to again become the opposite polarity from said annular magnetic member when said float reaches its low position.

6. The automatic drain valve system of claim 2 including a manual override for selectively opening said drain valve for discharging the contents of said reservoir.

7. The system of claim 2 wherein said drain valve is fully open when said float is at the high position wherein said drain valve stays fully open until said float is at the low position.

8. The system of claim 2 including protrusions carried by said float to assist in preventing cohesion between said float and the housing defining said reservoir.

9. The system of claim 2 wherein said reservoir is releasably attached to said housing, said reservoir comprising a cylindrical, a bottom plate attached to said wall, and first sealing means between said wall and said housing.

10. The system of claim 2 wherein said control valve selectively applies pneumatic pressure for actuation of said drain valve, said control valve and said drain valve being disposed in fluid communication.

* * * * *